Patented Aug. 27, 1946

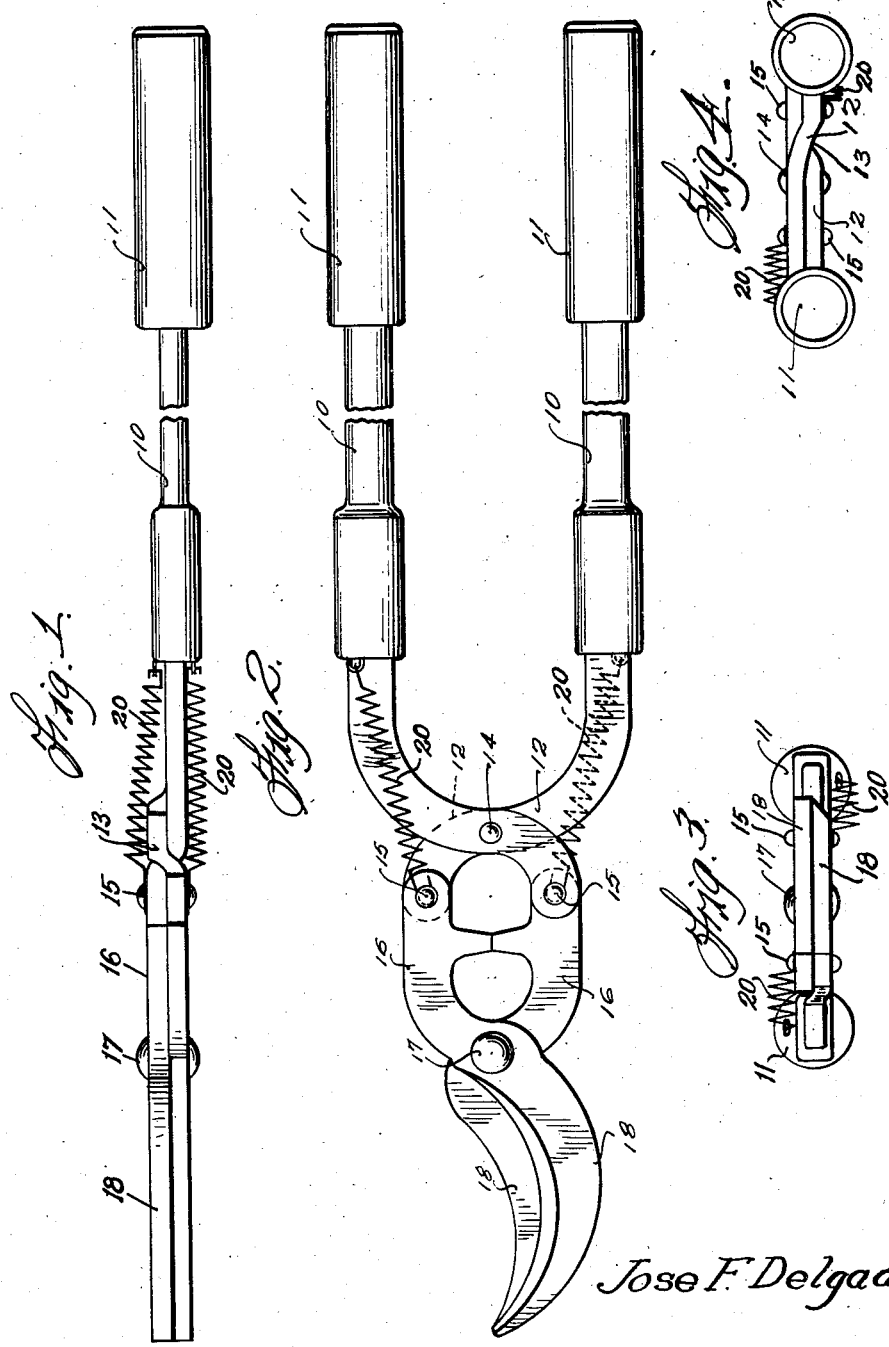

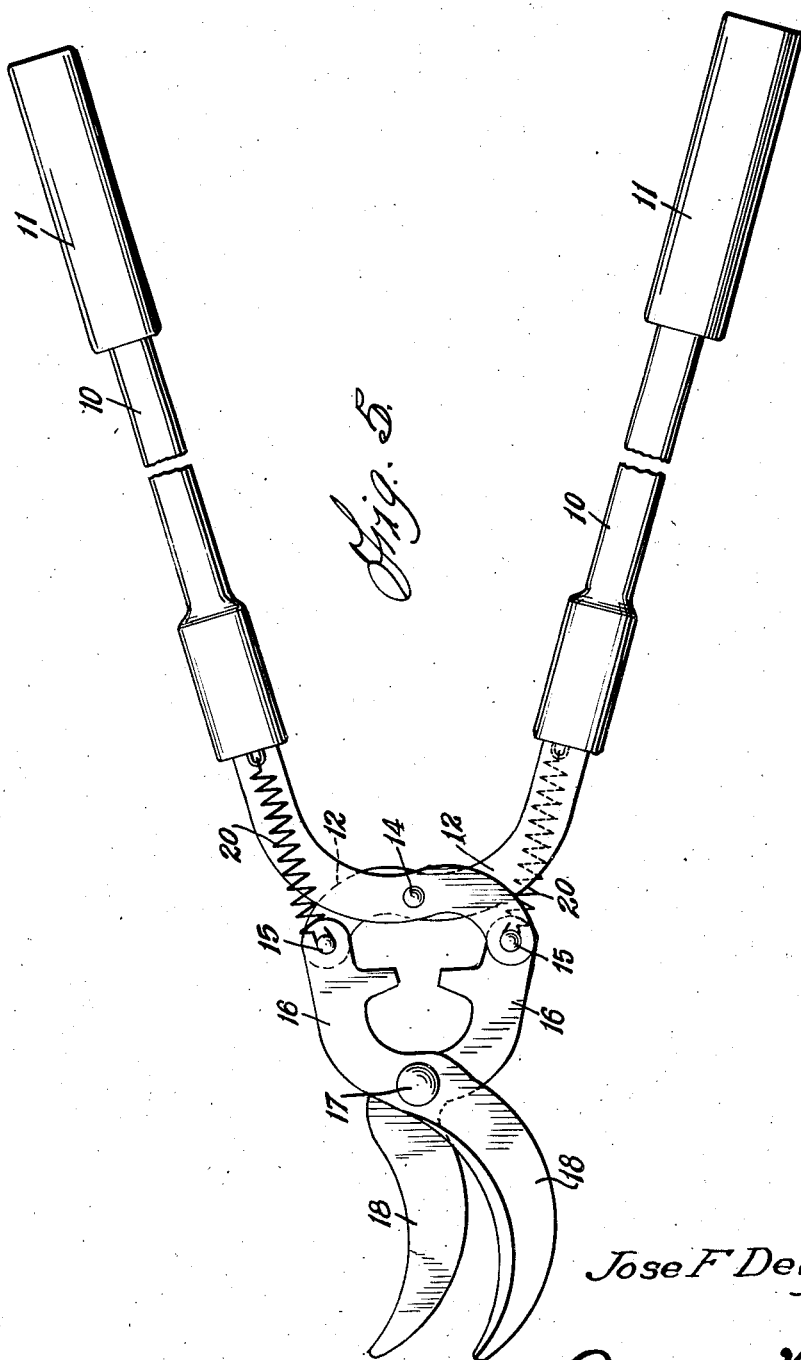

2,406,670

UNITED STATES PATENT OFFICE 2,406,670

PRUNING SHEARS

Jose F. Delgado, Sanger, Calif.

Application October 27, 1944, Serial No. 560,594

1 Claim. (Cl. 30—252)

This invention relates to pruning shears or similar devices adapted for cutting with scissor-like motion.

A primary object of this invention is the provision of improved pruning shears or the like provided with resilient means normally serving to bias the blades thereof to open position.

An additional object of the invention is the provision of such shears wherein the resilient means serve to decrease the effort required to operate the shears, whereby reducing materially the effort and exertion required on the part of the operator and consequent fatigue.

Other objects reside in the combinations of elements, arrangements of parts, and details of construction, all as will be more fully pointed out hereinafter and shown in the accompanying drawings, wherein there is disclosed a preferred embodiment of this inventive concept.

In the drawings—

Figure 1 is a side elevational view of one form of device embodying the instant invention.

Figure 2 is a top plan view of the device shown in Figure 1.

Figure 3 is an end elevational view of the device shown in Figures 1 and 2 as viewed from the left.

Figure 4 is an end elevational view of the device as viewed in the opposite direction, and Figure 5 is a top plan view similar to Figure 2 but disclosing the device in a different position of adjustment.

Having reference now to the drawings, there are generally indicated at 10 two oppositely disposed extending members provided with handles 11. Each of members 10 terminates in an arcuate S-shaped extremity 12, the extremities being offset as indicated at 13 and secured in pivotal relation as by a pivot pin 14. The extremity of each of members 12 is pivotally secured as by a pivot pin 15 to the extremity of an oppositely disposed pair of members 16 crossing and pivotally secured together as by a pivot pin 17 and terminating in shears or blades 18.

Thus it will be seen that as the handles 11 are moved to the position shown in Figure 5, the blades 18 are opened through the pivotal connections 15 and 17, and conversely as the handles are moved from the position shown in Figure 2 the blades are closed to effect the cutting action.

Suitable coil springs 20 are secured to each of pivot pins 15 and extend to and are suitably secured to the opposite extremity of the opposite extension 10, the arrangement being such that when the device is in the position shown in Figure 2, the tension of the spring tends to urge the blades and consequently the handles toward the open position shown in Figure 5.

In the operation of the device it will be readily understandable that a material effort must be exerted to close the blades in the cutting operation. Heretofore, a corresponding exertion has been required to return them to open position.

However, by means of the instant invention the springs 20 serve in a large measure to reduce the effort required to return the blades to open position, thus in effect substantially reducing the effort and exertion required in the operation of pruning.

From the foregoing it will now be seen that there is herein provided a device accomplishing all the objects of the instant invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In a device of the character described, a pair of oppositely disposed handle members terminating in pivotally secured crossed extremities, a pair of blade members pivotally secured to each other, and having their inner ends crossed, said ends and said extremities being pivotally secured together, resilient means biasing said blades toward open position, said resilient means comprising coil springs extending from the pivotal connection of said ends and said extremities to intermediate points on opposite handle members.

JOSE F. DELGADO.